United States Patent [19]

Okamoto et al.

[11] Patent Number: 4,757,394
[45] Date of Patent: * Jul. 12, 1988

[54] AUTO-TRACKING APPARATUS OF A MAGNETIC RECORDING/REPRODUCING APPARATUS

[75] Inventors: Kaneyuki Okamoto; Hideo Nishijima; Isao Fukushima, all of Katsuta, Japan

[73] Assignee: Hitachi, Ltd., Tokyo, Japan

[*] Notice: The portion of the term of this patent subsequent to Jan. 20, 2004 has been disclaimed.

[21] Appl. No.: 792,271

[22] Filed: Oct. 28, 1985

[30] Foreign Application Priority Data

Oct. 31, 1984 [JP] Japan .................. 59-227711

[51] Int. Cl.⁴ ............................................ H04N 5/782
[52] U.S. Cl. .................... 360/19.1; 358/342; 360/77; 360/70
[58] Field of Search ................... 360/19.1, 70, 77; 358/343

[56] References Cited

U.S. PATENT DOCUMENTS

| | | | |
|---|---|---|---|
| 4,210,943 | 7/1980 | Nakamura et al. | 360/70 |
| 4,527,203 | 7/1985 | Kamai | 360/19.1 |
| 4,591,924 | 5/1986 | Miura et al. | 358/330 |
| 4,609,949 | 9/1986 | Kutaragi | 360/27 X |
| 4,613,914 | 9/1986 | Kobou et al. | 360/70 |
| 4,638,379 | 1/1987 | Teshima | 358/343 X |

FOREIGN PATENT DOCUMENTS 59-45602 3/1984 Japan.

*Primary Examiner*—Aristotelis M. Psitos
*Attorney, Agent, or Firm*—Antonelli, Terry & Wands

[57] ABSTRACT

An auto-tracking apparatus of a magnetic recording/reproducing apparatus has a circuit for discriminating whether the audio signals recorded on a magnetic tape to be reproduced were recorded by audio rotary heads or a fixed head, and a circuit for selecting outputs of the audio rotary heads in the case of the Hi-Fi recorded magnetic tape by the audio rotary heads and outputs of the video rotary heads in the case where it is determined that the magnetic tape is the normal recorded tape by the fixed head on the basis of the result of the discrimination, and performs the auto-tracking on the basis of the selected outputs. With this arrangement, the auto-tracking can be carried out irrespective of whether the magnetic tape is the normal recorded tape by the conventional fixed head or the Hi-Fi recorded tape by the rotary heads.

8 Claims, 6 Drawing Sheets

AUTO-TRACKING APPARATUS OF A MAGNETIC RECORDING/REPRODUCING APPARATUS

BACKGROUND OF THE INVENTION

The present invention relates to a magnetic recording/reproducing apparatus such as a home video tape recorder or the like and, more particularly, to an auto-tracking control apparatus of a magnetic recording/reproducing apparatus which is suitable for the case where magnetic rotary heads automatically scan the record tracks obliquely formed on a magnetic tape by way of the helical scan system.

Recently, in addition to conventional home video tape recorders (hereinafter, abbreviated as VTR), what are called Hi-Fi video tape recorders (hereinafter, abbreviated as Hi-Fi VTR) which can record and reproduce audio signals with a high degree of fidelity have been commercialized.

Such Hi-Fi VTR intends to improve a sound quality due to an increase in relative speed between the tape and the head in a manner that the audio information, which has been hitherto recorded and reproduced by the fixed head, is frequency modulated and then recorded on the magnetic tape by use of a pair of rotary heads on the drum.

Such Hi-Fi VTR that attaches importance to the sound quality is equipped with a pair of rotary heads and also a conventional fixed head for recording and reproducing audio information and is used for various purposes such as in the following cases. Namely, there are the cases (i) where only audio signals are recorded by the audio rotary heads without recording a video signal; (ii) where the magnetic tape on which audio signals have been recorded by a conventional VTR, namely, audio signals have been recorded by the fixed head is reproduced; (iii) where both audio and video signals are recorded and reproduced by the rotary heads; (iv) where a video signal is recorded by the rotary heads and audio signals are recorded by only the fixed head; and (v) where a video signal is recorded by the rotary heads and audio signals are recorded by both the rotary and fixed heads.

Although Hi-Fi VTR is used in the foregoing various cases, the Hi-Fi VTR in which the auto-tracking is performed does not exist at present so far as the inventors of the present application know. In execution of the auto-tracking in Hi-Fi VTR, various kinds of problems are produced because of a reason such that the Hi-Fi VTR can be used in the various manner. An explanation will then be made hereinbelow with respect to an example of conventional auto-tracking apparatuses and problems which would be caused when such conventional auto-tracking apparatus is to be used for the Hi-Fi VTR.

FIG. 1 is a block diagram showing an example of an auto-tracking circuit which is used in a conventional magnetic recording/reproducing apparatus which records and reproduces audio signals using the fixed head. FIG. 2 is a diagram showing the waveforms in various points in the circuit of FIG. 1. FIG. 3 is a supplementary explanatory diagram.

An example of an auto-tracking apparatus similar to the conventional auto-tracking apparatus shown in FIG. 1 is disclosed in Japanese Patent Unexamined Publication No. 54-41114.

Reference may be made to the U.S. patent application Ser. No. 754,908 filed on July 15, 1985 (corresponding European patent application Ser. No. 85108880.7 filed on July 16, 1985), based on Japanese patent application No. 59-146759 filed July 17, 1984.

In FIG. 1, reference numeral 1 denotes a magnetic tape; 2 is a control pulse head (hereinafter, abbreviated as a CTLP head); 3 and 7 amplifiers for amplifying a control signal and a reproduced video signal, respectively; 4 and 11 delay circuits; 5 a window counter; 6 and 13 clock pulse generators; 8 an integrator; 9 and 10 waveform shaping circuits; 12 a monostable multivibrator; 14 a logic circuit; 15 a sampling counter; 16 a flip-flop; 17 an up/down counter; 18 a coincidence circuit; 19 a crystal resonator; 20 a crystal oscillator; 21 a frequency divider; 22 a ramp signal generator; 23 a phase comparator; 24 a capstan motor driving amplifier; 25 a capstan motor; 26 a speed control signal input terminal for switching among the standard reproducing mode, the one-third speed reproducing mode, and the like; 27 a reproduced video signal input terminal; 28 and 29 input terminals for receiving rotational phase detection signal of a pair of video rotary heads; and 30 a counter. In FIGS. 1 and 2, reference numerals 40 to 54 all represent voltage signals. In FIG. 3, numeral 70 denotes a magnetic tape; 71 and 72 are video heads; 73 and 74 track patterns recorded on the tape 70; 75 a drum motor; 76 a capstan motor; 77 and 78 trace loci of the centers of the video heads 71 and 72; 79 a reference signal generator; 80 and 81 phase control circuits; 82 a delay circuit; 83 a drum rotation detecting signal; and 84 a reproduced control pulse (hereinafter, abbreviated as a CTLP signal).

First, it is assumed that the track patterns 73 and 74 were recorded and formed on the magnetic tape 70 by the video heads 71 and 72, respectively. In this case, it is a general way to remove the adjacent disturbance by making the magnetizing directions of the heads differ with regard to both of the adjacent tracks 73 and 74 (practically speaking, the heads 71 and 72 are obliquely arranged at the angles $+\theta°$ and $-\theta°$ (azimuth angles) with respect to the longitudinal directions of the tracks, respectively). Therefore, assuming that the tracks 73 and 74 were respectively recorded by the video heads 71 and 72, in the case where one of the tracks is traced by the head the azimuth angle of which is the same as that of the head used when recording the same track, the output of the head becomes maximum, and in the opposite case, namely, in the case where one of the tracks is traced by the head which has the different azimuth angle from that used when recording, the output of the head becomes minimum. In the intermediate by the head having the same azimuth angle as that of the head used to record that track, the head output increases substantially in proportion to the area of the portion of the track which is scanned or traced by this head. Thus, for example, when the trace locus of the center of the head 71 is indicated at 77, the head output becomes maximum and in the case of the trace locus 78, the head output decreases than that maximum head output.

The drum motor 75 and capstan motor 76 are phase-controlled so that the rotary video heads 71 and 72 and the magnetic tape 70 in the magnetic recording/reproducing apparatus synchronously operate at a predetermined phase difference. Practically speaking, those synchronous operations are realized in a manner that the phase of the drum to which a pair of heads 71 and 72 are attached is locked by the phase control circuit 80 so that the phase of a reference signal 200 from the reference signal (30 Hz) generator 79 and the phase of the rotational phase detecting signal 83 of the drum motor 75 for driving the drum are locked, and at the same time a phase control is performed by the phase control circuit 81 so that the phase of the reproduced CTLP signal 84 and the phase of the reference signal 201 having a predetermined phase difference $\phi$ with regard to the reference signal 200 are locked. In this manner, the phase differences between the heads 71, 72 and the reproduced CTLP signal 84 are always fixed to constant value $\phi$. Thus the rotary video heads 71 and 72 trace the track patterns 73 and 74 recorded. However, actually, since the video heads 71 and 72 are distantly positioned from the playback head for reproducing the CTLP signal 84, in the case where the tape recorded by a magnetic recording/reproducing apparatus is reproduced by another magnetic recording/reproducing apparatus, the locus, e.g., the locus indicated at 78 in FIG. 3 which is deviated from the trace locus (77 in FIG. 3) having the proper phase difference $\phi$ is traced due to expansion and contraction of the magnetic tape, variation of the positions where the heads are attached, or the like, so that the reproduced picture quality deteriorates. To prevent this deterioration, the delay circuit 82 is provided for a reference signal 201 (or reproduced CTLP signal 84) as shown in FIG. 3 and thereby making it possible to control the delay amount by the user. Such coordination among that heads and the tracks is a so-called "tracking". FIG. 1 is a block diagram showing one of conventional examples of such systems that automatically perform this tracking operation. In this example, the system in which the phase control is executed by delaying the phase of the reproduced CTLP signal is adopted.

The operation of the system of FIG. 1 will be explained hereinbelow. First, the rotational phase detecting signals of the drum inputted through the terminals 28 and 29 in FIG. 1 are waveform-shaped by the waveform shaping circuits 9 and 10 (40 and 41 in FIG. 2). Both of those signals 40 and 41 are the pulses which are generated for every rotation of 180° of the drum 75 in FIG. 3. When the apparatus is constituted in a manner that both of those signals are generated at the timings which are almost simultaneous with the change-over timing of the heads 71 and 72, the information of the central portion of the screen of the television are traced by the heads 71 and 72 at the timings which are delayed by about 8 msec from both of those signals. (This is because the drum is rotating at a frequency of 30 Hz and the time required for one head to trace one track is a little over 16 msec.) Therefore, both of those signals are delayed by the delay circuit 11. Reference numeral 42 in FIG. 2 denotes the pulse which becomes a high level for this delay time. The tracking state can be most preferably monitored by sampling the reproduced signal outputs of the heads at the timing of the trailing edge of the pulse 42. Namely, the time of the trailing edge of the pulse 42 just corresponds to the central portion of a track formed obliquely on the magnetic tape relative to the longitudinal direction of the tape. The above-mentioned delay amount of 8 msec is set on the basis of the principle that when the reproduced signal output of the head is sampled at the timing corresponding to that central portion, the reproduced output signal can be almost certainly sampled even if the expansion and contraction of the magnetic tape, compatibility with other magnetic recording/reproducing apparatuses, and other various factors are considered.

The amplitude of the reproduced signal derived by the foregoing sampling is converted to the digital values in the following manner. The converting operation in this case will be first explained hereinbelow. First, the reproduced video signal (the signal 43 in FIG. 2) inputted through the terminal 27 is amplified by the amplifier 7 and smoothed by the integrator 8 (the signal 44 in FIG. 2). The monostable multivibrator 12 generates a signal which becomes a high level for the period of time proportional to the potential of the signal 44. For instance, such a monostable multivibrator can be easily realized in the following manner. A comparator having two inputs is used and the output (i.e., the signal 44) of the integrator 8 is connected to one input. The other input is connected so as to receive the voltage across a capacitor which increases at a constant rate as it receives the supply of a constant current from a constant current source which is triggered in response to the trailing edge of the output signal 42 of the delay circuit 11 and starts the supply of the constant current. The timing when the voltage of the capacitor has reached the potential of the signal 44 is detected by the comparator and the charges of the capacitor are discharged, then the comparator waits until a trigger signal is newly inputted, or the like. The comparator is constituted such that an output of the comparator becomes high for the charge period of time of the capacitor. Numeral 45 in FIG. 2 indicates an output signal of the monostable multivibrator 12. Further, the clock pulse generator 13 generates a clock pulse for only the period of time when the signal 45 is high and its output signal is indicated at 46. This clock pulse 46 is supplied to the logic circuit 14. The logic circuit 14 determines the increase or decrease of the delay amount of the running phase of the magnetic tape for the time period when the output signal 47 of the sampling counter 15 is high. The signal 47 is generated one pulse for every N-period of the rotation detecting signal 42 of the rotary heads. In the case of FIG. 2, N is set to 3. Namely, the value of N determines the period for the above-mentioned decision. The logic circuit 14 has therein a counter for accumulating and counting the clock pulse 46 for the time period commensurate with the latest N periods of the signal 42, a holder for holding the count value for the previous N periods immediately before those latest N periods, and a comparator. The accumulated count value B of the clock pulse 46 for the latest N periods which was accumulated and counted by that counter is compared with the count value A for the previous N periods held in the holder. When A>B (old data is larger than the latest data) as the result of this comparison, the pulse 48 is outputted. When A≦B (the old data is smaller than or equal to the latest data), no pulse is outputted. Triggered by the signal 48, the flip-flop 16 changes the level of its output 49. The up/down counter 17 discriminates the signal 49 as the count polarity (high: up-count, low: down-count) and after the level of the polarity signal 49 was established in dependence on the presence or absence of the pulse 48, the counter 17, depending upon the count porality, up- or down-counts in response to the trailing edge of the signal 47. In the example of FIG. 2, therefore, assuming that the initial value of the up/down counter 17 is M, the count value is counted up when the signal 49 is high. When the signal 49 becomes low after the count value became M+1, the count value is counted down and changes to M.

In addition to the above-mentioned operation, the delay loop of the CTLP signal exists. In this delay loop, after the reproduced CTLP signal 50 was amplified by the amplifier 3, it is slightly delayed by the delay circuit 4 and the window counter 5 is made operative in response to the trailing edge of the output signal 51 of the delay circuit 4. The clock pulse generator 6 generates the clock pulse train 53 in response to the output 52 of the counter 5. The coincidence circuit 18 outputs the delayed CTLP signal 54 when the number of clock pulses of the clock pulse train 53 coincides with the value held in the up/down counter 17. In this example, therefore, as shown at 54 in FIG. 2, the CTLP output signal which contains pulses delayed by $T_d$ from the CTLP signal 50 is generated at the timing when the number of pulses of the clock pulse train 53 coincides with M, M+1 and M. The phase of the CTLP signal 54 changes with a resolution corresponding to one period of the clock pulse 53.

The foregoing overall control can be summarized as follows. That is, the delay amount of the CTLP signal to be phase-controlled is controlled so that the output from the head becomes maximum. This is because, this delay amount is held in the up/down counter and this count value is controlled so that the output from the head increases. In other words, in the case where the output level of the video head after the change of the delay amount is larger than the previous value, namely, than the head output level before the delay amount is changed, the delay amount of the CTLP signal is continued to be changed in the same direction. In other words, the CTLP signal is further increased or further decreased depending upon the previous change direction. In the opposite case, the change direction is reversed. In this manner, the delay amount is varied so that the head output data always increases.

The signal of, e.g., 3.58 MHz generated from the oscillator 20 is divided by the frequency divider 21 and changed to the signal of a low frequency of, e.g., 30 Hz. The ramp signal generator 22 is triggered by this low-frequency signal and generates a repetitive wave of a constant peak value of a triangular wave. The phase comparator 23 compares an output of the ramp signal generator 22 with the CTLP signal 54 of the coincidence circuit 18 and samples and holds the peak value of the ramp signal at the generation timing of the CTLP signal 54. In this way, the delay amount of the CTLP signal 54 is converted to the signal having the level corresponding to the delay amount by the phase comparator 23. The motor driving amplifier 24 amplifies an output signal of the phase comparator 23. The capstan motor 25 is controlled at the speed corresponding to the delay amount of the CTLP signal 54 due to an output of the amplifier 24.

As described earlier, in Hi-Fi VTR, the audio information which, conventionally, is recorded and reproduced by the fixed head is frequency modulated by a pair of rotary heads attached to the drum and then recorded on the magnetic tape. In addition, such Hi-Fi VTR is also equipped with the fixed head similar to the conventional one so that the magnetic tape on which the audio information has been recorded by the fixed head can be also reproduced.

In the case where the conventional auto-tracking system as mentioned above is to be applied to such Hi-Fi VTR, there would be the following drawbacks. Namely, in such Hi-Fi VTR that attaches importance to the sound quality, only the audio signals are recorded by the audio rotary heads in many cases. In this case, the auto-tracking based on the output from the video head cannot be performed. On the contrary, in the case of the normal recorded tape on which audio signals were recorded by the fixed head of the conventional apparatus, the auto-tracking cannot be performed by use of the outputs of the audio rotary heads. In addition, it is important that the good tracking can be derived by executing the auto-tracking by using the audio signals in the case where both of the video and audio signals were recorded. This is because the width of the video head is generally wider than the widths of the audio heads and there is an allowance for a slight tracking deviation in the case of the video head; on the contrary, the audio heads are narrow and sensitive for the tracking deviation. For those reasons, it is necessary to smoothly and accurately perform the auto-tracking even for the tapes recorded by any recording system by making use of the outputs of the audio and video rotary heads.

SUMMARY OF THE INVENTION

It is an object of the present invention to provide an auto-tracking control apparatus which, when used in a magnetic recording/reproducing apparatus such as Hi-Fi VTRs which can be used in various manner, can perform the smooth auto-tracking therefore perform the smooth reproduction even in the case of magnetic tapes on which audio signals were recorded by way of any recording system.

To accomplish the above object, according to one aspect of the present invention, an auto-tracking apparatus of a magnetic recording/reproducing apparatus comprises means for determining whether a tape is a Hi-Fi recorded tape or not, means for selecting output of audio rotary heads in the case of the Hi-Fi recorded tape and outputs of video rotary heads in other cases, and means for automatically controlling the running phase of the magnetic tape, wherein the running phase control means controls the running phase of the magnetic tape and thereby allowing the auto-tracking operation to be performed on the basis of the outputs of the audio rotary heads in the case of the Hi-Fi recorded magnetic tape and on the basis of the outputs of the video rotary heads in the case where audio signals were recorded on the magnetic tape by a conventional fixed head.

DESCRIPTION OF THE PREFERRED EMBODIMENTS

Figure 1:
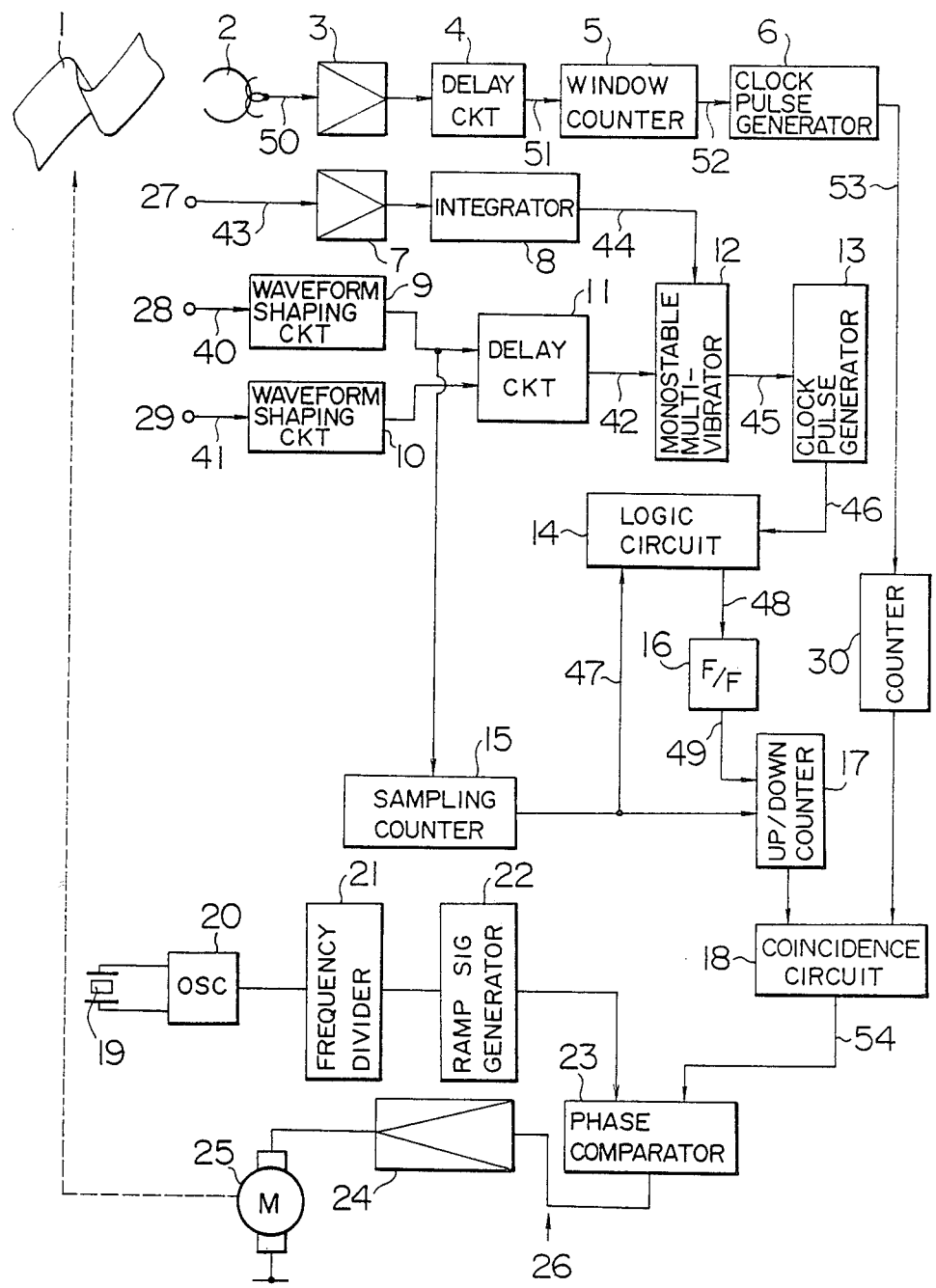
FIG. 1 is a block diagram showing a circuit of an auto-tracking apparatus of a conventional magnetic recording/reproducing apparatus.
Figure 2:
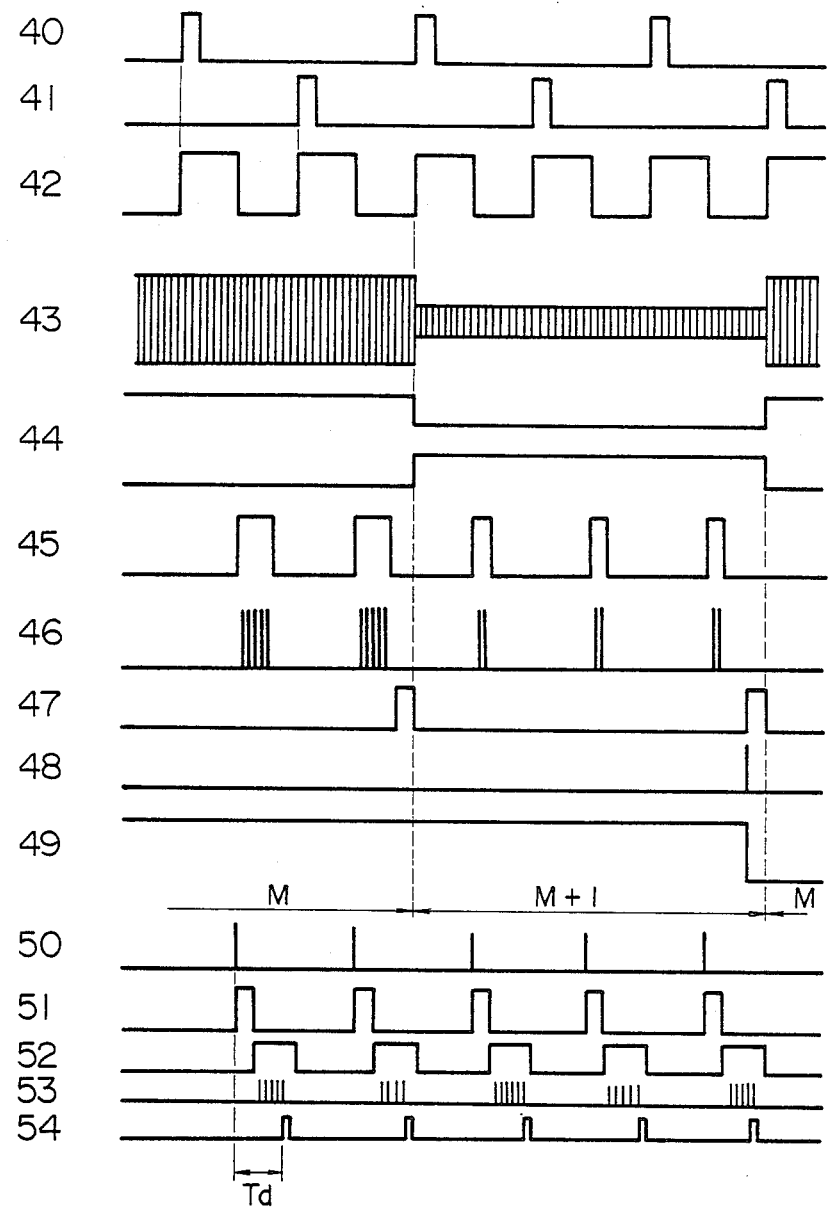
FIG. 2 is a diagram useful for explaining the operation of the apparatus of FIG. 1.
Figure 3:
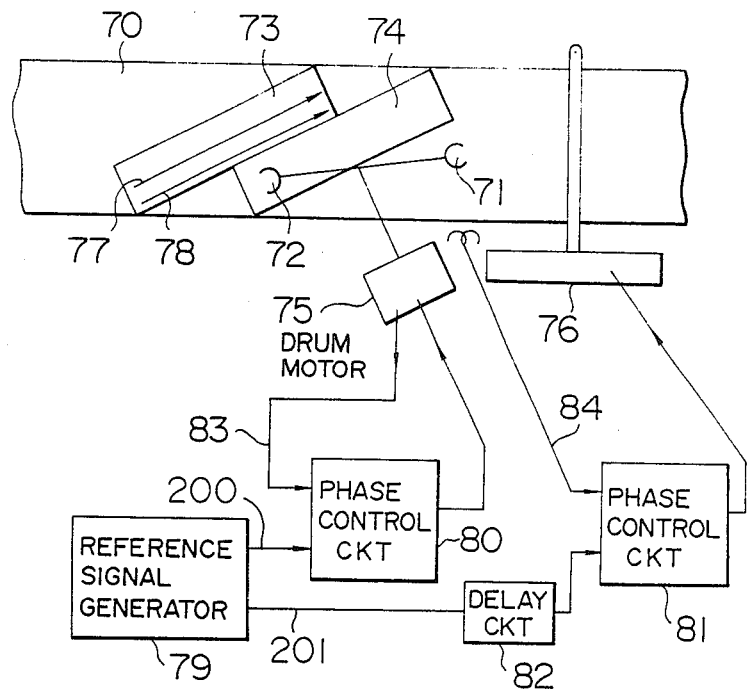
FIG. 3 is a diagram for explaining the fundamental operation of auto-tracking.
Figure 4:
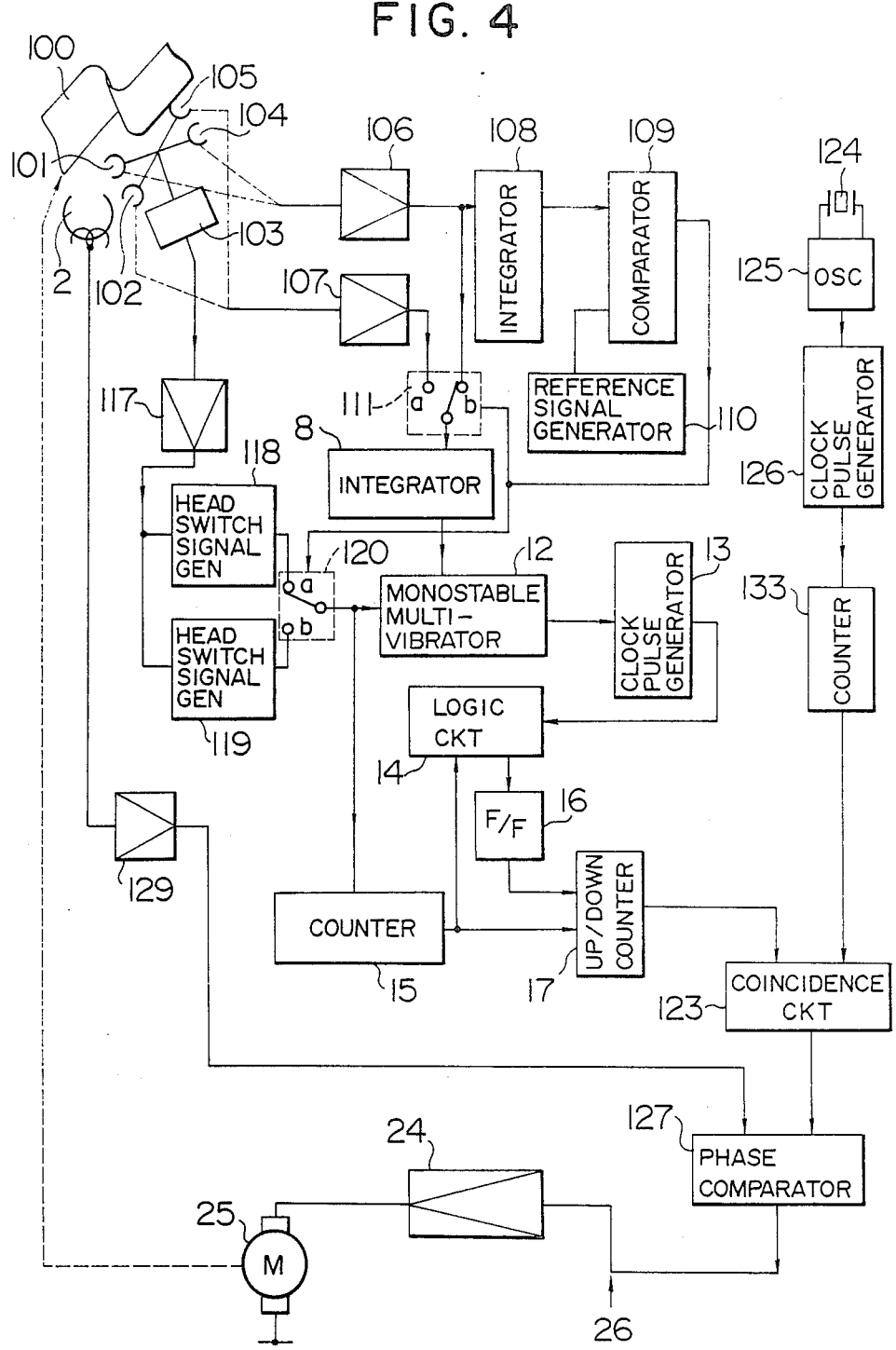
FIG. 4 is a diagram showing one embodiment of the present invention.

One embodiment of the present invention will be described hereinbelow with reference to FIG. 4, in which the parts and components similar to those in FIG. 1 are designated by the same reference numerals and their detailed descriptions are omitted. In FIG. 4, reference numeral 100 denotes a magnetic tape and 101, 102, 104, and 105 are rotary heads, in which the heads 101 and 104 are for audio signals and the heads 102 and 105 are for a video signal. Numeral 103 denotes a drum motor; 106 and 107 are amplifiers for reproducing audio signals and a video signal, respectively; 117 collectively indicates amplifiers of rotational phase detecting signals of a pair of heads 101 and 104 and a pair of heads 102 and 105; 129 an amplifier of the CTLP signal from the CTLP head 2; 108 an integrator (or peak hold circuit); 109 a comparator; 110 a reference signal generator, which may be constituted by a resistance bleader and the like; 111 and 120 change-over switches; 8 the integrator; 12 the monostable multivibrator; 13 the clock pulse generator; 14 the logic circuit; and 16 the flip-flop. A head switch signal generator 118 forms a head switch signal corresponding to the signal 42 in FIG. 2 on the basis of the rotational phase detecting signals of the audio heads 101 and 104 amplified by the amplifier 117. A head switch signal generator 119 forms the head switch signal corresponding to the signal 42 in FIG. 2 on the basis of the rotational phase detecting signals of the video heads 102 and 105 amplified by the amplifier 117. Numeral 15 denotes the counter; 17 the up/down counter; 123 a coincidence circuit; 124 a crystal resonator; 125 a crystal oscillator; 133 a counter; 126 a clock pulse generator; 127 a phase comparator; 2 the control head; 24 the motor driving amplifier; 25 the capstan motor for running the magnetic tape 100; and 26 the speed control signal input terminal. The essential point of the present invention is that there is provided a mechanism which determines whether the audio signals were recorded by the audio rotary heads or not and then automatically selects one of outputs of the audio or video heads to be used as the reproduced signal necessary for auto-tracking. In the embodiment of FIG. 4, as one of the means for such a mechanism, the output levels of the audio rotary heads 101 and 104 are discriminated and on the basis of the result the audio/video signals are switched as the detecting signal for the auto-tracking.

In operation, the audio signals are first reproduced by the heads 101 and 104 upon starting of the auto-tracking. These reproduced audio signals are then amplified by the amplifier 106 and the amplified output signals are integrated by the integrator 108. By setting the time constant of this integrator to about 100 msec (0.1 Hz) and by extracting the low frequency components of the amplified output signals, the level of the head outputs can be monitored. The level of the low frequency component of the head output is compared with the level of the constant voltage from the reference signal generator 110 by the comparator 109. The change-over switches 111 and 120 are made operative on the basis of an output signal of the comparator 109. Namely, assuming that the output voltage from the integrator 108 is $V_1$ and the output voltage from the generator 110 is $V_2$, the switches 111 and 120 are switched to side b when $V_1 \geq V_2$ and side a when $V_1 < V_2$.

In the case where the audio signals are detected from the audio rotary heads 101 and 104 due to the switching operations of the switches 111 and 120, the signals associated with the audio rotary heads 101 and 104, namely, the outputs from these heads and the head switch signal corresponding to the rotation of these heads, or in the case where the audio signals are not detected, the signals associated with the video rotary heads 102 and 105, namely, the outputs from these video heads and the heads switch signal corresponding to the rotation of these video heads are selectively supplied as the signal for the auto-tracking to the running phase control circuit constituted by the parts and components 8, 12 to 17, 123 to 127, 129 and 133, so that the auto-tracking can be carried out. With the arrangement as mentioned above, when reproducing a magnetic tape, in the case where the audio signals of a predetermined level are detected from the audio rotary heads, it is determined that this tape is a tape on which the audio signals have been Hi-Fi recorded by the rotary heads, so that the auto-tracking is performed on the basis of the audio tracks. On the other hand, when the audio signals of the predetermined level are not detected, it is decided that the audio signals have been recorded by the fixed heads, so that the auto-tracking is executed on the basis of the video tracks.

It is discriminated whether the audio signals on the magnetic tape to be reproduced have been recorded by the fixed head or by a pair of rotary heads by the discriminating circuit constituted by the integrator 108, reference signal generator 110 and comparator 109. On the basis of the result of the discrimination, for example, the reproduced audio signals from the pair of audio rotary heads and the head switch signal formed on the basis of the rotational phases of the audio rotary head pair are respectively inputted through the switches 111 and 120 to the circuit constituted by the integrator 8, monostable multivibrator 12, clock pulse generator 13, logic circuit 14, flip-flop 16, counter 15, and up/down counter 17. The up/down counter 17 outputs a count value to designate the delay amount of the running phase of the magnetic tape in the similar manner as in the case of the auto-tracking circuit of FIG. 1. On the other hand, the clock pulse generator 126 is triggered by the output of the crystal oscillator 125, which oscillates at the frequency (e.g., 3.58 MHz) which is determined by the crystal resonator 124, and generates a clock pulse of a predetermined frequency. The counter 133 connected to an output of the generator 126 repeates the operation such as to count the number of clock pulse from 0 for 1/30 second (i.e., the rotational period of the drum motor 103) and again count from 0 for the next 1/30 second. The coincidence circuit 123 outputs one pulse when the count value held in the up/down counter 17 coincides with the count value of the counter 133. On the other hand, the CTLP signal from the control head 2 is amplified by the amplifier 129 and converted to the analog signal of the level corresponding to the delay amount designated by the up/down counter 17 by the phase comparator 127 together with an output of the coincidence circuit 123. This analog signal is amplified by the motor driving amplifier 24 and drives the capstan motor 25, thereby allowing the magnetic tape to run at the phase having the delay amount designated.

Figure 5:
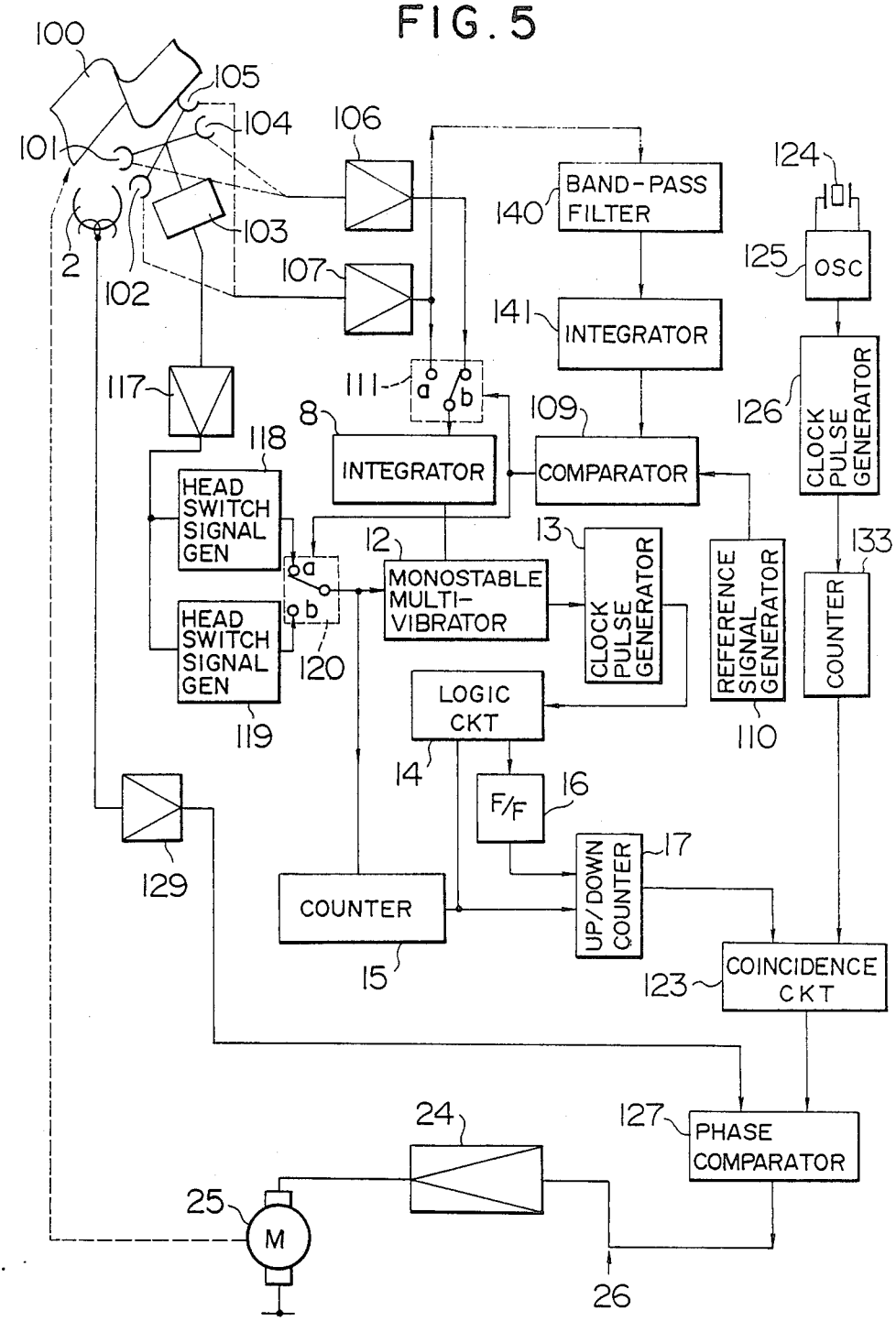
FIG. 5 is a diagram showing another embodiment of the invention.

In the above-mentioned embodiment, the system in which a discrimination is made to see if audio signals have been Hi-Fi recorded or not on the basis of the levels of the reproduced outputs from the audio rotary heads has been described. However, it is also possible to adopt the system in which such discrimination is made by detecting the leakage of the audio signals from the audio tracks to the video heads. FIG. 5 shows an embodiment based on the principle of this different system.

The embodiment of FIG. 5 will now be described hereinbelow, in which the parts and components similar to those in FIG. 4 will be designated by the same reference numerals and their detailed descriptions are omitted. In FIG. 5, numeral 140 is a band-pass filter and 141 is an integrator. In this example, first, the band-pass filter is used to detect the carrier of the audio signals of Hi-Fi recording. Namely, it is so arranged that the center frequency of the pass-band of this filter is set to be coincident with the carrier frequency so as to have the steep peak characteristic (high Q value). With this design, for the Hi-Fi recording, the leakage of the audio signals to the video heads increases and the level of the frequency modulation carrier also increases. Thus, an output of the band-pass filter 140 increases and the output derived by smoothing the output by the integrator 141 also increases. In the opposite case where the Hi-Fi recording was not performed, the output level decreases. In this way, the Hi-Fi recording can be also discriminated in this embodiment as well. The subsequent operation is performed in a manner similar to the foregoing embodiment.

Figure 6:
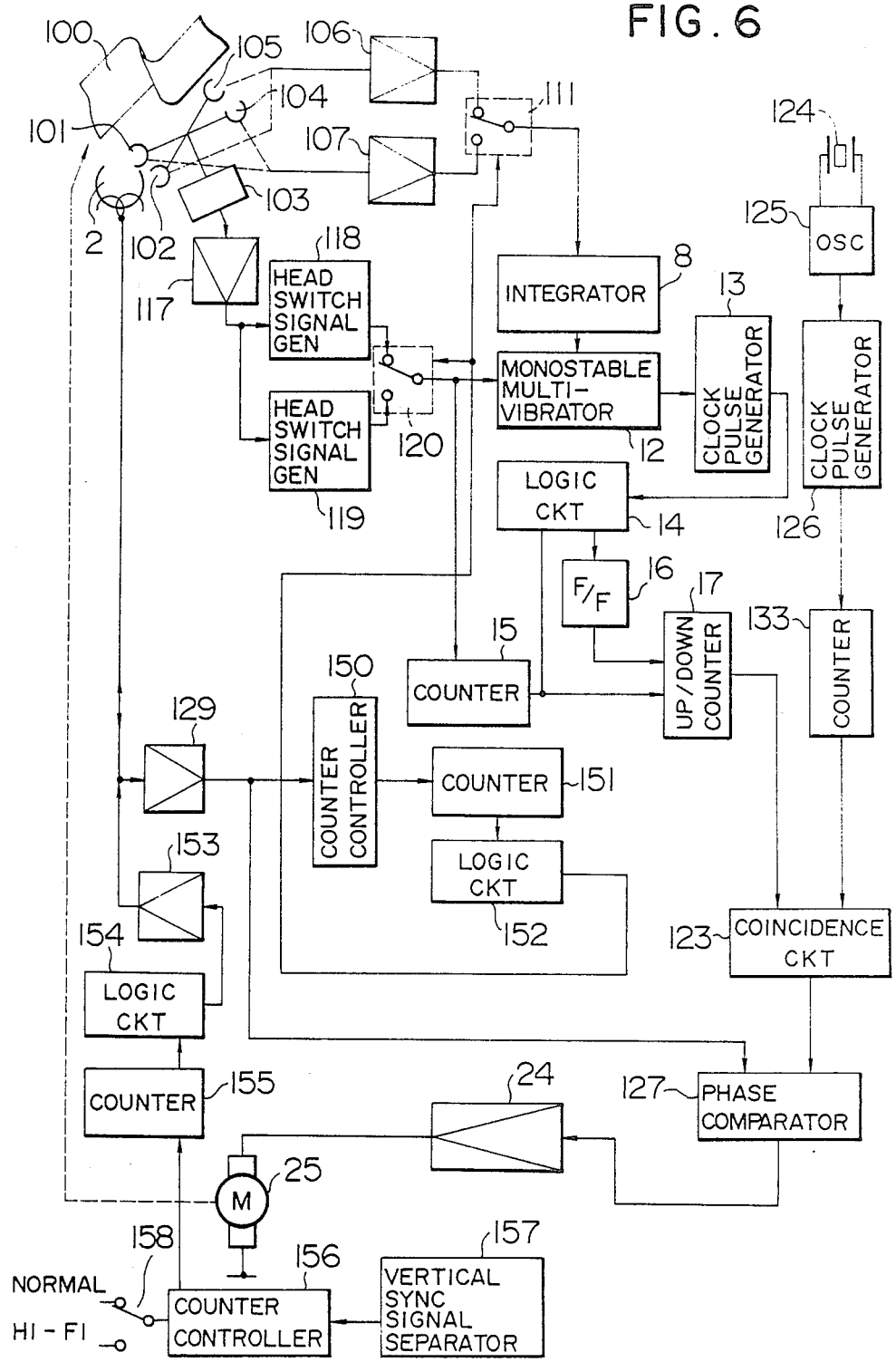
FIG. 6 is a diagram showing still another embodiment of the invention.

Further another embodiment of the invention will now be described hereinbelow. In this embodiment, the Hi-Fi recording can be discriminated by recording the information indicative of the Hi-Fi recording or the normal recording due to the fixed head on the magnetic tape and checking it. For example, this discrimination can be realized by the method whereby the duty of a control signal is used and such information is added to the control signal. Namely, the control signal is recorded by setting the duty thereof to 70% in the case of the Hi-Fi recording and to 50% in the case of the normal recording by the fixed head. In reproduction, the duty of the control signal is monitored and thereby deciding the Hi-Fi recording or normal recording. FIG. 6 shows an embodiment for explaining an example of the practical method for this purpose.

In FIG. 6, reference numerals 150 and 156 denote counter controllers; 151 and 155 are counters; 152 and 154 logic circuits; 153 an output amplifier; 157 a vertical sync signal separator; and 158 a switch to change over between the normal recording (i.e., the fixed head system) and the Hi-Fi recording. Although the control signal is recorded and reproduced by the control head 2, the components from the output amplifier 153 to the switch 158 are used in recording. In reproduction, the amplifier 129, counter controller 150, counter 151, and logic circuit 152 are used. First, in recording, the vertical sync signal portion of the recording signal is detected by the separator 157 and thereafter the counter controller 156 uses this signal as a trigger signal and makes the counter 155 operative. The counter 155 then counts a clock signal (not shown). The logic circuit 154 outputs a signal which is at a high level until the count value of the counter 155 reaches a predetermined count value. For instance, assuming that the clock period is 0.1 msec for simplicity, the timing when 233 ($=33.3\times0.7/0.1$) clocks have been counted is measured to obtain the duty of 70% of the period of 33.3 msec of the control signal. On the other hand, to derive the duty of 50%, the timing when 167 ($=33.3\times0.5/0.1$) clocks have been counted is measured. This switching is performed by the switch 158. An output of the logic circuit 154 is amplified by the amplifier 153 and recorded on the magnetic tape by the control head 2. Therefore, the operation to generate the square wave signals of the duty of 70% in Hi-Fi recording and of 50% in normal recording can be realized by the circuits comprised from the output amplifier 153 to the separator 157. The discriminating operation of the Hi-Fi recording in reproduction will now be described. In reproduction, the control signal reproduced by the control head 2 and amplified by the amplifier 129 makes the counter controller 150 operative and allows the counter 151 to start counting. Now, assuming that the clock period (not shown) of the counter 151 is also 0.1 msec, 233 clocks are counted for the control signal of the duty of 70% and 167 clocks are counted for the control signal of the duty of 50%. Therefore, by designing the logic circuit 152 having the threshold value of about 200 clocks, the Hi-Fi recording can be discriminated. For instance, a count value of 200 of the counter 151 is expressed, by a binary notation, as "1100100"; therefore, the logic circuit may be arranged so as to discriminate that the sixth and seventh bits of the count value of the counter 151 are high and at the same time either of the third, fourth and fifth bits is high. Such logic circuit can be realized by a circuit as shown in FIG. 7.

Figure 7:
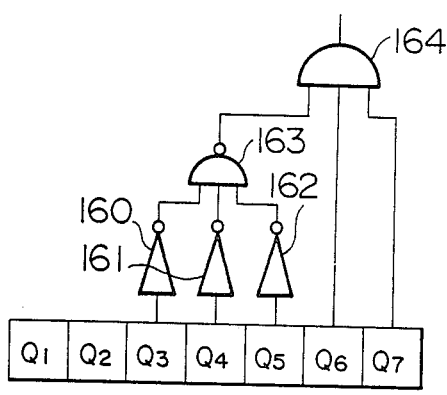
FIG. 7 is a diagram showing a practical circuit example of a logic circuit in FIG. 6.

In FIG. 7, numerals 160 to 162 are inverters; 163 is a NAND gate; 164 an AND gate; and $Q_1$ to $Q_7$ are outputs of the counter 151. With this arrangement, the AND gate 164 generates a signal which becomes high when the count value is over 200 and low when it is below 200. Thus, the Hi-Fi recording can be discriminated by the embodiment of FIG. 6. The auto-tracking can be respectively carried out by the audio FM signals in the case of the Hi-Fi recording and by the video FM signals in the case of the normal recording in dependence on the output of the AND gate 164. Although the counter was used for measurement of the duty of the control pulse in the embodiment of FIG. 6, it is obvious that such measurement can be realized by an analog circuit such as a monostable multivibrator or the like which can measure the time.

While this invention has been described with reference to illustrative embodiments, this description is not intended to be construed in a limiting sense. Various modifications to the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. An auto-tracking apparatus of a magnetic recording/reproducing apparatus comprising:
   a pair of video rotary heads and a pair of audio rotary heads for recording and reproducing a video signal and an audio signal, respectively, on a magnetic tape;
   means for selecting one of the signal reproduced by said pair of audio rotary heads and the signal reproducted by said pair of video rotary head; and
   means for automatically controlling a running phase of said magnetic tape so that a level of the selected signal becomes large;
   wherein said selecting means comprises:
   means for generating a reference signal of a predetermined level;
   means for comparing the level of the signal reproduced by said pair of audio rotary heads with said predetermined level of said reference signal; and
   switch means for performing said selection on the basis of an output of said comparing means.

2. An auto-tracking apparatus of a magnetic recording/reproducing apparatus comprising:

a pair of video rotary heads and a pair of audio rotary heads for recording and reproducing a video signal and an audio signal, respectively, on a magnetic tape;

means for selecting one of the signal reproduced by said pair of audio rotary heads and the signal reproduced by said pair of video rotary heads; and means for automatically controlling a running phase of said magnetic tape so that a level of the selected signal becomes large;

wherein said selecting means comprises:

means for detecting a level of leakage of an FM carrier signal recorded by said pair of audio rotary heads to said pair of video rotary heads; and switch means for performing said selection on the basis of an output of said detecting means.

3. An auto-tracking apparatus of a magnetic recording/reproducing apparatus comprising:

a pair of video rotary heads and a pair of audio rotary heads for recording and reproducing a video signal and an audio signal, respectively, on a magnetic tape;

means for selecting one of the signal reproduced by said pair of audio rotary heads and the signal reproduced by said pair of video rotary heads; and means for automatically controlling a running phase of said magnetic tape so that a level of the selected signal becomes large;

wherein said selecting means comprises:

means for recording on said magnetic tape an information signal representing whether said audio signal was recorded by said pair of audio rotary heads when said audio signal is recorded by said audio rotary heads, means for reproducing said information signal in reproduction of said magnetic tape and for discriminating whether the reproduced audio signal was recorded by the audio rotary heads or not on the basis of the reproduced information signal; and switch means for performing said selection on the basis of an output of said discriminating means; and wherein said recording means includes means for changing a duty factor of a control pulse signal to be recorded on said magnetic tape in dependence on whether said audio signal is to be recorded by said pair of audio rotary heads or not;

and said discriminating means includes means for detecting a duty ratio of said control pulse signal.

4. An auto-tracking apparatus of a magnetic recording/reproducing apparatus comprising:

a pair of video rotary heads and a pair of audio rotary heads for recording and reproducing a video signal and an audio signal, respectively, on a magnetic tape;

running means for running said magnetic tape;

means for discriminating whether, in a reproducing mode, said reproduced audio signal was fixed-head recorded or rotary-head recorded on the basis of an output of said pair of audio rotary heads or said pair of video rotary heads;

means connected to an output of said discriminating means for selecting the output of said pair of video rotary heads when it is determined that said audio signal was fixed-head recorded and the output of said pair of audio rotary heads when it is determined that said audio signal was rotary-head recorded; and control means connected to an output of said selecting means for controlling said magnetic tape running means on the basis of an output of said selecting means and thereby controlling a running phase of the magnetic tape;

wherein said discriminating means has means for detecting a level of low frequency component of said audio signal reproduced by said pair of audio rotary heads, means for generating a reference signal of a predetermined level, and means for comparing the level of said low frequency component with said predetermined level of said reference signal, and said selecting means performs said selectig operation on the basis of an output of said comparing means.

5. An auto-tracking apparatus according to claim 4, wherein said means for detecting the level of said low frequency component includes an integrator.

6. An auto-tracking apparatus according to claim 4, wherein said magnetic recording/reproducing apparatus includes a Hi-Fi video tape recorder.

7. A auto-tracking apparatus of a magnetic recording/reproducing apparatus comprising:

a pair of video rotary heads and a pair of audio rotary heads for recording and reproducing a video signal and an audio signal, respectively, on a magnetic tape;

running means for running said magnetic tape;

means for discriminating whether, in a reproducing mode, said reproduced audio signal was fixed-head recorded or rotary-head recorded on the basis of an output of said pair of audio rotary heads or said pair of video rotary heads;

means connected to an output of said discriminating means for selecting the output of said pair of video rotary heads when it is determined that said audio signal was fixed-head recorded and the output of said pair of audio rotary heads when it is determined that said audio signal was rotary-head recorded; and control means connected to an output of said selecting means for controlling said magnetic tape running means on the basis of an output of said selecting means and thereby controlling a running phase of the magnetic tape;

wherein said discriminating means includes means for detecting a level of a leakage carrier signal of said audio signal detected by said pair of video rotary heads, means for generating a reference signal of a predetermined level, and means for comparing the level of said leakage carrier signal with the level of said reference signal, and said selecting means performs said selecting operation on the basis of an output of said comparing means.

8. An auto-tracking apparatus according to claim 7, wherein said means for detecting the level of the leakage carrier signal includes a series connection of bandpass filter and an integrator.

* * * * *